INVENTORS
WILFORD P. CRISE
ARNOLDS JANSONS

United States Patent Office 2,962,937
Patented Dec. 6, 1960

2,962,937

METHOD OF CUTTING IRREGULAR CAMS AND GEARS

Wilford P. Crise, 2456 Sherwood Road, Columbus, Ohio, and Arnolds Jansons, 3032 N. Park, Indianapolis, Ind.

Filed July 16, 1956, Ser. No. 598,217

3 Claims. (Cl. 90—9)

(Granted under Title 35, U.S. Code (1952), sec. 266)

The invention described herein may be manufactured and used by or for the Government of the United States of America for governmental purposes without the payment of any royalties thereon or therefor.

The present invention relates to a method of cutting cams and gears, and particularly to the cutting of radial type cams and gears that have irregular or non-circular profiles.

It has been standard practice in the past to cut radial type cams by making a plurality of circular cuts with a cutter having a diameter approximately equal to the diameter of the follower that is to operate with the cam being cut. After the circular cuts are made around the periphery of the cam blank, the peaks are removed by grinding or cutting until a smooth profile is formed. If a large number of cams are to be produced, a master cam is usually made and additional units are made by using a pantograph or other tracing equipment. The cams produced by the heretofore described method are satisfactory for many purposes, but the cams do not have the required accuracy for use in computers and other precision equipment.

The present invention provides a method of cutting cams that produces a very accurate profile. A reference line is scribed or otherwise designated on a cam blank and this reference line passes through the center of rotation of the cam. For various angles from the reference line, the distances to a plurality of tangents are calculated and a multiple number of flat cuts are made, thus forming the desired cam profile.

The present method of cutting profiles is also adaptable for producing non-circular gears which are required in computing equipment. Heretofore non-circular gears were rarely used because of the extreme difficulty involved in producing them; however, the present invention readily lends itself to large production runs that results in an economical cost per unit.

It is therefore a general object of the present invention to provide a novel method of cutting cam and gear profiles of extreme accuracy. Other objects and advantages of the present invention will be more readily understood by reference to the following detailed description when considered in connection with the accompanying drawings wherein.

Figure 1:
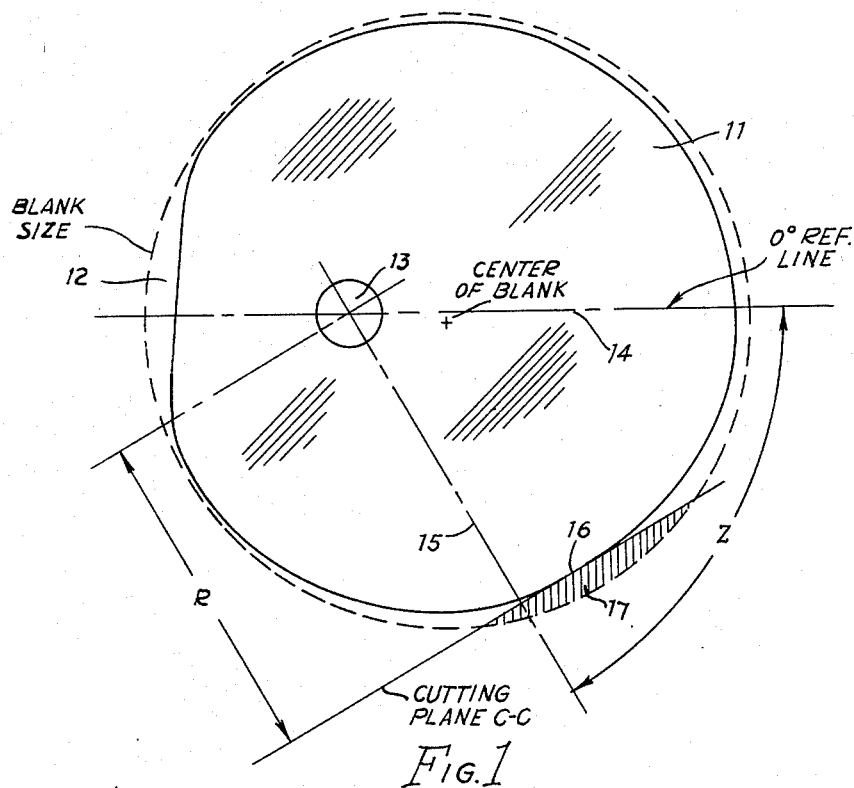
Figure 1 shows a cam of the type produced by the method herein described.

Referring first to Figure 1 of the drawings, a cam 11 is shown having been cut from a circular blank 12. A hole 13 is provided for mounting the cam 11 and a reference line 14 is shown scribed on the face of the cam and passing through the center of the hole 13. In producing the finished cam profile, the cam blank 12 is rotated an angle Z about the center of hole 13 and a tangential cut is made. It should be noted that the point of tangency does not necessarily lie on line 15, but rather is at point 16. As shown in Figure 1 of the drawings, the cutting along plane C—C would remove the shaded area 17, if that were the first cut made, as it is obvious that subsequent cuts will overlap to some extent.

Figure 2:
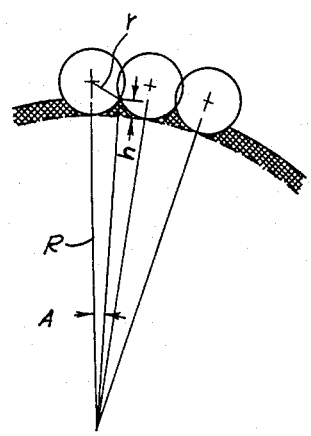
Figure 2 is an illustration showing a cam profile being produced by a heretofore known method.
Figure 3:
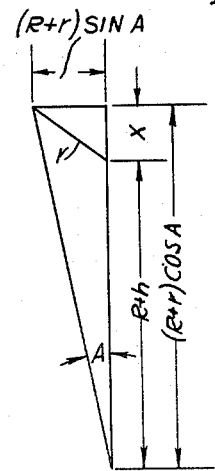
Figure 3 is a diagram showing the mathematical relationship of the angles and distances shown in Figure 2.
Figure 4:
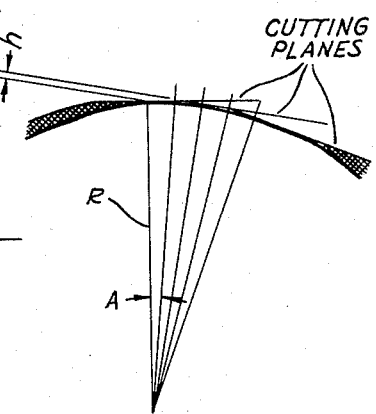
Figure 4 is an illustration showing a cam profile being produced by the present invention.

Referring now to Figures 2 and 3 of the drawings, it is quite apparent that the cutting plane method shown in Figures 1 and 4 is much more accurate than the heretofore known method of making circular cuts, as shown in Figure 2. Referring to Figures 2 and 3 of drawings, it can be seen that where R is the distance from the center of rotation of the cam to a point on the cam periphery; $r$ is the radius of a cam cutter; and $h$ is the height of the peaks that are formed when cutting the cam periphery; then (1) $$R+h=(R+r)\cos A - x$$

and also (2) $$x=\sqrt{r^2-(R+r)^2 \sin^2 A}$$

and therefore (3) $$R+h=(R+r)\cos A - \sqrt{r^2-(R+r)^2 \sin^2 A}$$

and (4) $$\frac{h}{R}=\left(1+\frac{r}{R}\right)\cos A - 1 - \sqrt{\frac{r^2}{R^2}-\left(1+\frac{r}{R}\right)^2 \sin^2 A}$$

If the angle A is made very small, then $\cos A \doteq 1$ and Equation 4 can be simplified to:

(5) $$\frac{h}{R} \doteq \frac{r}{R} - \frac{r}{R}\sqrt{1-\left(\frac{R}{r}+1\right)^2 \sin^2 A}$$

and since the expression $$\left[\left(\frac{R}{r}+1\right)^2 \sin^2 A\right]$$

is very small due to angle A being small, the expression (6) $$\sqrt{1-\left(\frac{R}{r}+1\right)^2 \sin^2 A} \doteq 1 - \frac{1}{2}\left(\frac{R}{r}+1\right)^2 \sin^2 A$$

and therefore Equation 5 becomes:

(7) $$\frac{h}{R} \doteq \frac{r}{R} - \frac{r}{R}\left[1-\frac{1}{2}\left(\frac{R}{r}+1\right)^2 \sin^2 A\right]$$

Now if $r$ is kept very small in relation to R, then Equation 7 can be reduced to:

(8) $$\frac{h}{R} \doteq \frac{1}{2}\sin^2 A\left(\frac{R+r}{r}\right)$$

Referring now to Figure 4 of the drawings, it can be seen that for the cutting plane method:

(9) $$R+h=\frac{R}{\cos A}$$

and dividing by R

(10) $$\frac{h}{R} = \frac{1}{\cos A} - 1$$

and since
$$\sin^2 A + \cos^2 A = 1$$
then

(11) $$\frac{h}{R} = \frac{1}{\sqrt{1-\sin^2 A}} - 1$$

and if angle A is again small:

(12) $$\sqrt{1-\sin^2 A} \doteq 1 - \frac{1}{2}\sin^2 A$$

and therefore

(13) $$\frac{h}{R} = \frac{1}{2}\sin^2 A$$

Upon comparison of Equations 8 and 13 above, it can be seen that Equation 8 has an additional factor of $$\left(\frac{R+r}{r}\right)$$

not present in Equation 13. If practical values were set for R and r, such for example of $R=1.00$ inch and $r=.125$ inch, then:

(14) $$\frac{R+r}{r} = \frac{1.125}{.125} = 9$$

Equation 14 indicates that by using the same number of cuts in both methods, the height of the peaks in Figure 2 will be 9 times greater than the peaks in Figure 4, and it can be seen that as the radius R of the cam is increased the height of the peaks will be proportionately increased. Thus it can be seen that the cutting plane method shown in Figure 4 produces a more accurate cam than that produced by the method shown in Figure 2 of the drawings.

Figure 6:
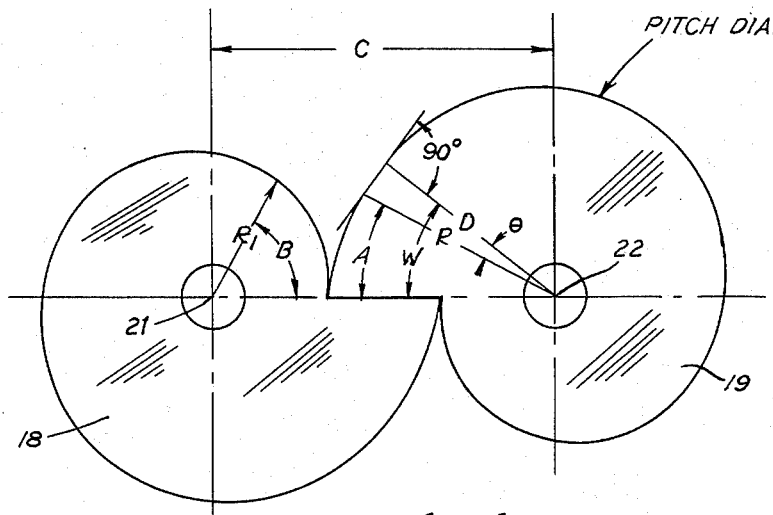
Figure 6 is an illustration showing the pitch diameters of a pair of gears produced by the present invention.

Referring now to Figure 6 of the drawings, there is illustrated the pitch diameters of gears 18 and 19, the gear teeth not being shown. The center of rotation 21 of gear 18 is spaced a distance C from the center of rotation 22 of gear 19, and for all positions of rotation:

(15) $$R + R_1 = C$$

where R and $R_1$ are variable distances from the center of rotation of gears 18 and 19, respectively, to points on the pitch diameters of the respective gears.

Figure 7:
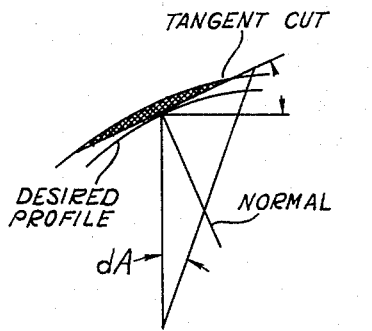
Figure 7 is a diagram showing a tangential cut on a cam blank.
Figure 8:
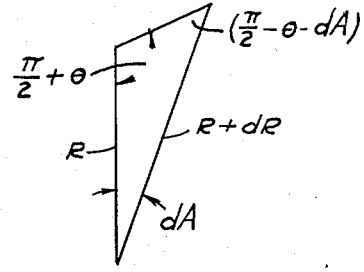
Figure 8 is a diagram showing the mathematical relationship of the angles involved in the present invention.

Referring now to Figures 7 and 8 of the drawings, it can be seen that by the Law of Sines:

(16) $$\frac{R}{\sin\left(\frac{\pi}{2}-\theta-dA\right)} = \frac{R+dR}{\sin\left(\frac{\pi}{2}+\theta\right)}$$

and therefore

(17) $$\frac{R+dR}{R} = \frac{\sin\left(\frac{\pi}{2}+\theta\right)}{\sin\left(\frac{\pi}{2}-\theta-dA\right)}$$

and if
$$\dot{R} = \frac{dR}{dA}$$
then

(18) $$1 + \frac{\dot{R}}{R}dA = \frac{\cos\theta}{\cos(\theta+dA)}$$

which can be expanded to

(19) $$1 + \frac{\dot{R}}{R}dA = \frac{\cos\theta}{\cos\theta\cdot\cos dA - \sin\theta\cdot\sin dA}$$

and by dividing by $\cos\theta$, and since for small angles $dA \doteq 0$,
$$\cos dA \doteq 1$$

and
$$\sin dA \doteq dA$$
then

(20) $$1 + \frac{\dot{R}}{R}dA = \frac{1}{1-dA\tan\theta} \doteq 1 + dA\tan\theta$$

therefore

(21) $$\tan\theta \doteq \frac{1}{R}\frac{dR}{dA}$$

Referring again to Figure 6 of the drawings, it can be seen that:

(22) $$W = A + \theta$$

and that

(23) $$\cos\theta = \frac{D}{R}$$

and therefore

(24) $$D = R\cos\theta$$

In operation, Equations 21 and 24 can be solved by putting in desired values and a table of values can be computed for the operator to use. The first step would be to set a value for dA, which should be a small angle, as for example 1°. Increased accuracy will be obtained by decreasing the value for dA; however, as a greater number of cuts will be required, the cost of producing a particular gear will be increased.

From the desired functional relationship between angles A and B, and a given center distance C, as shown in Figure 6 of the drawings, the designer can calculate the values for R and $R_1$ by expressing the values for R and $R_1$ as functions of the turning angles A and B; namely $R=f(A)$ and $R_1=f(B)$. For the same functional relationship, a change in center distance C will cause a direct proportional change of the radii R and $R_1$, for the same angles A and B. Having found the various values for R, $\Delta R$ is obtained readily by addition or subtraction, and these values can be placed in Equation 21 and the values for $\theta$ determined.

Having obtained a value for $\theta$, that value can be placed in Equations 22 and 24 to get the angle of rotation W and the distance D that a cutter must be placed from the center of rotation. Normally the cutter will be stationary and the gear blank will be rotated, and the symbols in Figure 6 can be interpreted to mean that if a desired point of tangency is at A degrees and a distance of R from the center of rotation, then the gear blank must be rotated W degrees, and the cutter placed at a distance D from the center of rotation of the gear blank.

Figure 5:
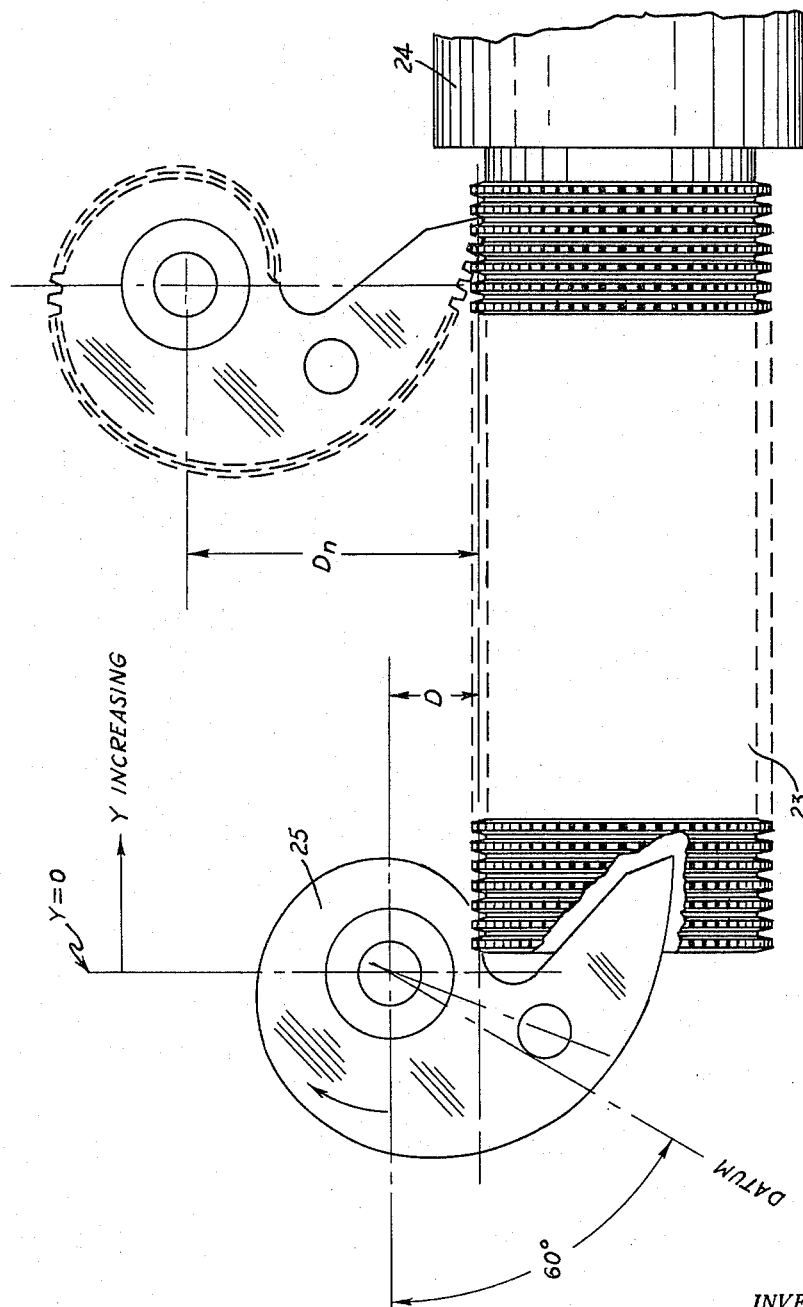
Figure 5 is a view showing a gear being produced by the method herein described.
Figure 9:
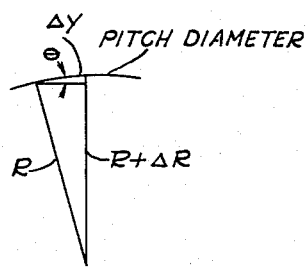
Figure 9 is a diagram showing the change in length of the pitch diameters.

Referring now to Figure 5 of the drawings, there is shown a cutter 23 attached to suitable rotatable means 24. There is illustrated a gear blank 25 in a starting position, and the same gear blank is shown approaching the finish operation. It should be observed that the gear blank has traveled from the left end of the cutter toward the right, much in the same way as if the cutter had been a rack. Thus it can be seen that a third dimension is required for proper indexing of the teeth. The third dimension required is the length along the pitch diameter from the starting position to any given position on the pitch diameter. This distance has been designated Y, and from Figures 6 and 9 of the drawings it can be seen that:

(25) $$\sin\theta = \frac{\Delta R}{\Delta Y}$$

and therefore

(26) $$\Delta Y = \frac{\Delta R}{\sin\theta}$$

Since $\Delta R$ and the angle $\theta$ are known for each position of the gear blank along the cutter 23, $\Delta Y$ can readily be calculated for each position. Thus it can be seen that an operator's job merely consists of making three settings for each cut, that is, (1) rotating the gear blank 25 a ΔW amount, (2) setting the distance D for each position, and (3) indexing the gear blank ΔY, as calculated, for each position.

It can be seen in Figure 5 of the drawings that it is possible to have more than 360° of teeth cut on the blank. The gear cutter 23 must therefore have a cut-out or bore so that the end of the gear blank can pass within the cutter, as shown.

Although the foregoing description is necessarily of a detailed character, it should be understood that numerous modifications or alterations may be made therein without departing from the spirit and scope of the invention.

What is claimed is:

1. The method of producing a gear having an irregular pitch diameter comprising the steps of first computing a multiple number of radial distances at predetermined angles from a reference line, said computed radial distances being the perpendicular distances from the axis of rotation of said gear to planes that are tangent to the pitch diameter of said gear to be cut, said planes being tangent to the pitch diameter of said gear to be cut at points other than along the perpendicular lines that said distances are measured, next rotatably mounting a gear blank about an axis of rotation, and then making a plurality of tangential cuts in said planes on said gear blank with a cutter at the computed distances from said axis of rotation of said gear blank, said gear blank being successively rotated and indexed about said axis of rotation a predetermined amount after each tangential cut whereby a plurality of gear teeth are produced on an irregular periphery.

2. The method of producing an irregular surface on a blank comprising the steps of first computing a multiple number of radial distances at predetermined angles from a reference line, said computed radial distances being the perpendicular distances from the axis of rotation of said blank to planes that are tangent to said irregular surfaces to be cut, said planes being tangent to the irregular surfaces to be cut at points other than along the perpendicular lines that said distances are measured, next rotatably mounting a blank about an axis of rotation, and then making a plurality of tangential cuts in said planes on said blank with a cutter at the computed distances from said axis of rotation of said blank, said blank being successively rotated about said axis of rotation a predetermined amount after each tangential cut whereby said plurality of tangential cuts produce an irregular surface on said blank.

3. The method of producing a gear having an irregular pitch diameter comprising the steps of first computing a multiple number of radial distances at predetermined angles from a reference line and the distances along the pitch line of the gear from the reference line corresponding to these angles, said computed radial distances being the perpendicular distances from the axis of rotation of said gear to planes that are tangent to the pitch diameter of said gear to be cut, said planes being tangent to the pitch diameter of said gear to be cut at points other than along the perpendicular lines that said distances are measured, next rotatably mounting a gear blank about an axis of rotation, and then making a plurality of tangential cuts in said planes on said gear blank with a cutter at the computed distances from said axis of rotation of said gear blank, said gear blank being successively rotated about said axis of rotation a predetermined amount and indexed by advancing the center of the gear blank parallel with the pitch line of the gear cutter a predetermined amount whereby a plurality of gear teeth are produced on an irregular periphery.

References Cited in the file of this patent

UNITED STATES PATENTS

| | | |
|---|---|---|
| 1,922,756 | Candee | Aug. 15, 1933 |
| 2,325,696 | Meier | Aug. 3, 1943 |
| 2,371,702 | Miller et al. | Mar. 20, 1945 |
| 2,736,239 | Higashi et al. | Feb. 28, 1956 |
| 2,850,948 | James | Sept. 9, 1958 |

FOREIGN PATENTS

| | | |
|---|---|---|
| 531,563 | Great Britain | Jan. 7, 1941 |
| 732,154 | Germany | Feb. 23, 1943 |